(12) United States Patent
Heselhaus (10) Patent No.: US 7,594,689 B2
(45) Date of Patent: Sep. 29, 2009

(54) TOP FOR A CONVERTIBLE VEHICLE

(75) Inventor: Udo Heselhaus, Ibbenburen (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 140 days.

(21) Appl. No.: 10/599,509

(22) PCT Filed: Mar. 18, 2005

(86) PCT No.: PCT/DE2005/000501

§ 371 (c)(1),
(2), (4) Date: Sep. 29, 2006

(87) PCT Pub. No.: WO2005/095138

PCT Pub. Date: Oct. 13, 2005

(65) Prior Publication Data

US 2008/0054671 A1 Mar. 6, 2008

(30) Foreign Application Priority Data

Apr. 1, 2004 (DE) .................... 10 2004 016 201

(51) Int. Cl.
*B60J 7/12* (2006.01)
(52) U.S. Cl. ..................... 296/107.04; 296/107.09; 296/107.11

(58) Field of Classification Search ............ 296/107.12, 296/107.04, 107.09, 107.11
See application file for complete search history.

(56) References Cited

U.S. PATENT DOCUMENTS

| | | | | | |
|---|---|---|---|---|---|
| 2,707,129 | A | * | 4/1955 | Orr | 296/107.12 |
| 2,711,924 | A | * | 6/1955 | Orr | 296/107.12 |
| 3,075,804 | A | * | 1/1963 | Friedrich et al. | 296/107.12 |
| 4,708,389 | A | * | 11/1987 | Maebayashi et al. | 296/107.12 |
| 6,871,899 | B2 | * | 3/2005 | Mandl et al. | 296/107.12 |
| 6,886,880 | B2 | * | 5/2005 | Heselhaus | 296/107.07 |
| 6,971,705 | B2 | * | 12/2005 | Nania | 296/118 |

* cited by examiner

*Primary Examiner*—Dennis H Pedder
(74) *Attorney, Agent, or Firm*—Quinn Law Group, PLLC.; Christopher W. Quinn (57) ABSTRACT

A top for a convertible vehicle with a flexible roof panel, which is attached to an arrangement of convertible-top rods and, in its rear area, to an attachment device of the vehicle body, in which a clamping device, acting on the flexible roof panel in the region of its attachment to the vehicle body in the closed state of the convertible top, is provided. The clamping device is designed with at least one bracket that forces the flexible roof panel in the closed state of the convertible top against an auto-body closure seal.

14 Claims, 7 Drawing Sheets

TOP FOR A CONVERTIBLE VEHICLE

CROSS-REFERENCE TO RELATED APPLICATION

This application is a US National Phase of International Application No. PCT/DE 2005/000501, filed Mar. 18, 2005, which claims priority to German 10 2004 016 201.8, filed Apr. 1, 2004. The entire contents of the above-identified applications are incorporated herein by reference.

TECHNICAL FIELD

The invention relates to a convertible top for a convertible vehicle.

BACKGROUND OF THE INVENTION

In principle, when a flexible roof panel of a convertible top is attached, the flexible roof panel can be attached using a separate bracket, which moves with the motion of the convertible top, or the flexible roof panel can be attached to the body.

One known example of attaching a flexible roof panel to a roof holding clamp connected to a convertible-top mechanism is disclosed in DE 39 03 680 C1.

Another example of attaching a convertible top with a flexible roof panel for a convertible vehicle, wherein the convertible top is attached directly to the body is disclosed in EP 0 502 320 A2. In this example, a convertible top attachment is provided that includes an attachment structure on the body, at least in the rear part of the vehicle. The convertible top material is attached near an edge of the attachment structure using a clamping element. An auto-body clamping strip, including the attachment structure and a clamping profile connected water-tight to the convertible top material using an integrated clamping element are then clamped to each other in an auto-body shaft that is covered by body parts in the connection position. A cord insert that extends over the entire width of the rear part of the vehicle in the area of the trunk lid is proposed as an integrated clamping element in the clamping profile.

The clamping profile is clamped with an auto-body clamping strip held to body parts that are mounted on one edge of a water-channel sheet forming an auto-body shaft. The body parts lie beneath the trunk lid when the convertible top is in the closed state. The trunk lid lies against the flexible roof panel of the convertible top when the convertible top is in the closed state with an auto-body closure seal that reduces friction.

In this known arrangement, there is little latitude in the configuration of the clamping profile and the integrated clamping element because a larger spacing, between the auto-body closure seal of the trunk lid and the clamping profile provided to join the flexible roof panel to the auto body, adversely affects the sealing effect in the region of the auto-body closure seal. Consequently, an arrangement of the clamping profile contained in the clamping element for the flexible roof panel positioned at a vehicle height position close to the vehicle height position of the auto-body closure seal is advantageous. However, such a comparatively high arrangement of the flexible roof panel/auto body joint means that the storage position of the convertible top must also be relatively high with respect to the height of the vehicle. As such, the latitude for configuration of the auto body and convertible top is significantly restricted.

Yet another known convertible top attachment is disclosed in DE 1 192 529. In this example, the convertible top material is held in an attachment structure, designed as an attachment groove, by a clamping element mounted from the outside. The convertible top material is pulled into the attachment groove in the form of a loop. A tension wire, which serves as the clamping element, is positioned directly on the loop of the convertible top material and causes a notch effect that adversely affects the convertible top material at the edge when the necessary tightening forces are applied. In addition, the arrangement of the attachment of the convertible top material and the clamping element does not permit a low position of a convertible top storage space with respect to the height of the vehicle.

roof of a vehicle structure to be opened is also disclosed in U.S. Pat. No. 4,708,398. In this example, a flexible convertible top is attached at the rear to the vehicle body. For sealing of the convertible top relative to the vehicle body, a two-part clamp is provided on each side of the vehicle. A part of the two-part clamp located on the vehicle front side and a part of the two-part clamp located on the vehicle rear side. The two parts of the two-part clamp are joined to each other via an articulation. In a transition from an open state to a closed state of the convertible top, this two-part clamp is moved around a pivot axis on the vehicle front. The two-part clamp pivots around the pivot axis from a lowered storage position into a sealing position in the vehicle height direction that forces the convertible top against a sealing device on the auto-body side. The part of the clamp on the vehicle rear side is then raised by a strip attached on the rear part of the clamp and a transverse clamp. The part of the clamp is held in the sealed position by the strip.

This type of configuration of the clamp and its drive, however, is demanding.

Additional mechanisms for sealing of a roof cover of a convertible top relative to the convertible vehicle body are disclosed, for example, in U.S. Pat. No. 5,100,195, DE 19750 418 A1 and DE 1 192 592.

SUMMARY OF THE INVENTION

It is a task of the present invention to devise a convertible top for a convertible vehicle with a flexible roof panel of the type mentioned. More specifically, a convertible top in which storage of the convertible top at a low vehicle-height level is possible, while guaranteeing the necessary clamping effect and sealing effect in the closed state of the convertible top.

This task is solved according to the present invention with a convertible top for a convertible vehicle as disclosed herein.

The embodiment of a convertible top according to the present invention includes a clamping device acting on the flexible roof panel. The clamping device is designed with at least one bracket that forces the flexible roof panel against an auto-body closure seal when the convertible top is in the closed state. This configuration is advantageous because the joining of the flexible roof panel to the auto body can be accomplished well beneath the rearward auto-body opening line and an auto-body closure seal adjacent to it without adversely influencing the effect in the closed state of the convertible top. Since the convertible top can be stored lower with respect to the vehicle height, the deeper joining of the flexible roof panel to the auto body is accomplished. That is, it is possible to choose a much deeper joining point of the flexible roof panel with the auto body compared to an edge solution which includes a joining in the area of the edge of the flexible roof panel with a corresponding material length between the rear-window and the auto-body connection.

Because the at least one clip according to the invention can be pivoted on the rear side of the vehicle around an articulation attached to the auto body, during transfer of the convertible top from such a low storage position into a closure position, the clip can force the flexible roof panel against the auto-body closure seal with a simply designed articulation mechanism.

The auto-body closure seal, according to the present invention, is to be understood in its broadest sense and can represent any type of seal that is supposed to prevent entry of water into a body shaft. The auto-body closure seal is advantageously arranged adjacent to the body-opening line.

The clamping device can be designed both with a single bracket that essentially spans the vehicle width and with several, preferably two, symmetrically arranged brackets, which, in terms of its operation, represent both separately driven units and units that can be moved with the convertible-top rods in connection with the convertible top motion.

Additional advantages and advantageous embodiments of the object according to the invention can be found in the description, the drawing, and the claims.

DESCRIPTION OF THE PREFERRED EMBODIMENTS

Figures 1, 3:
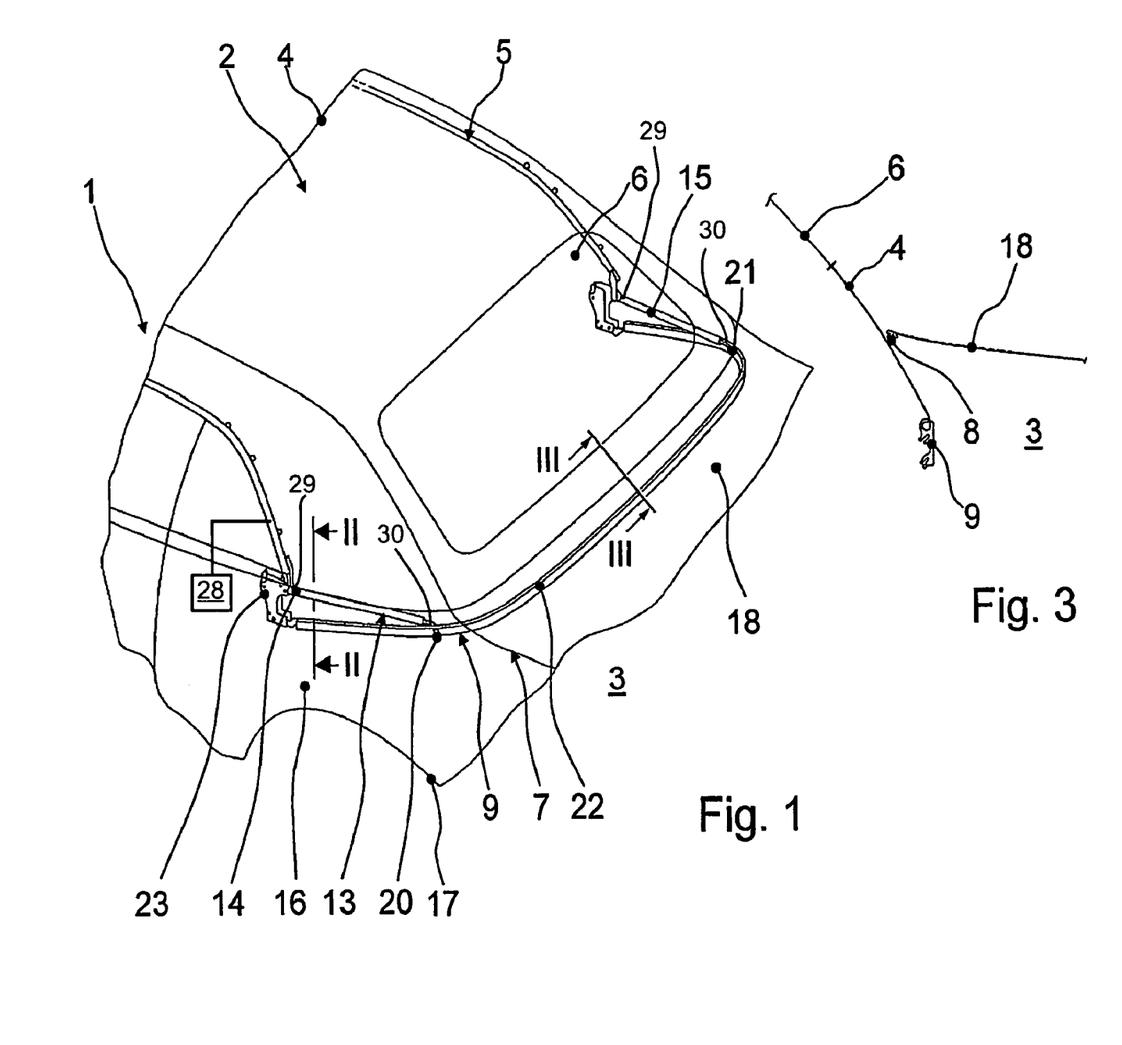
FIG. 1 shows a perspective partial view of a rear area of a convertible vehicle with a convertible top in the closed state and schematically represents a drive device engaging a convertible-top rod.
FIG. 3 shows a schematic, simplified cross-section through the convertible top of FIG. 1 and its clamping device along a line III-III in FIG. 1.

A rear area of a convertible vehicle 1 is shown in FIG. 1, in which a convertible top 2 can be moved between a closed position lying against a roof peak of vehicle 1 and a stored position in a storage space 3 in the rear.

The convertible top 2 is designed as a so-called soft top or fabric convertible top with a flexible roof panel 4, which is attached to an arrangement of convertible-top rods 5 supporting the convertible top 2 and causing movement of the convertible top 2. The convertible top 2 is connected with its edge region to the vehicle body 7 beneath a rear window 6.

Figure 2:
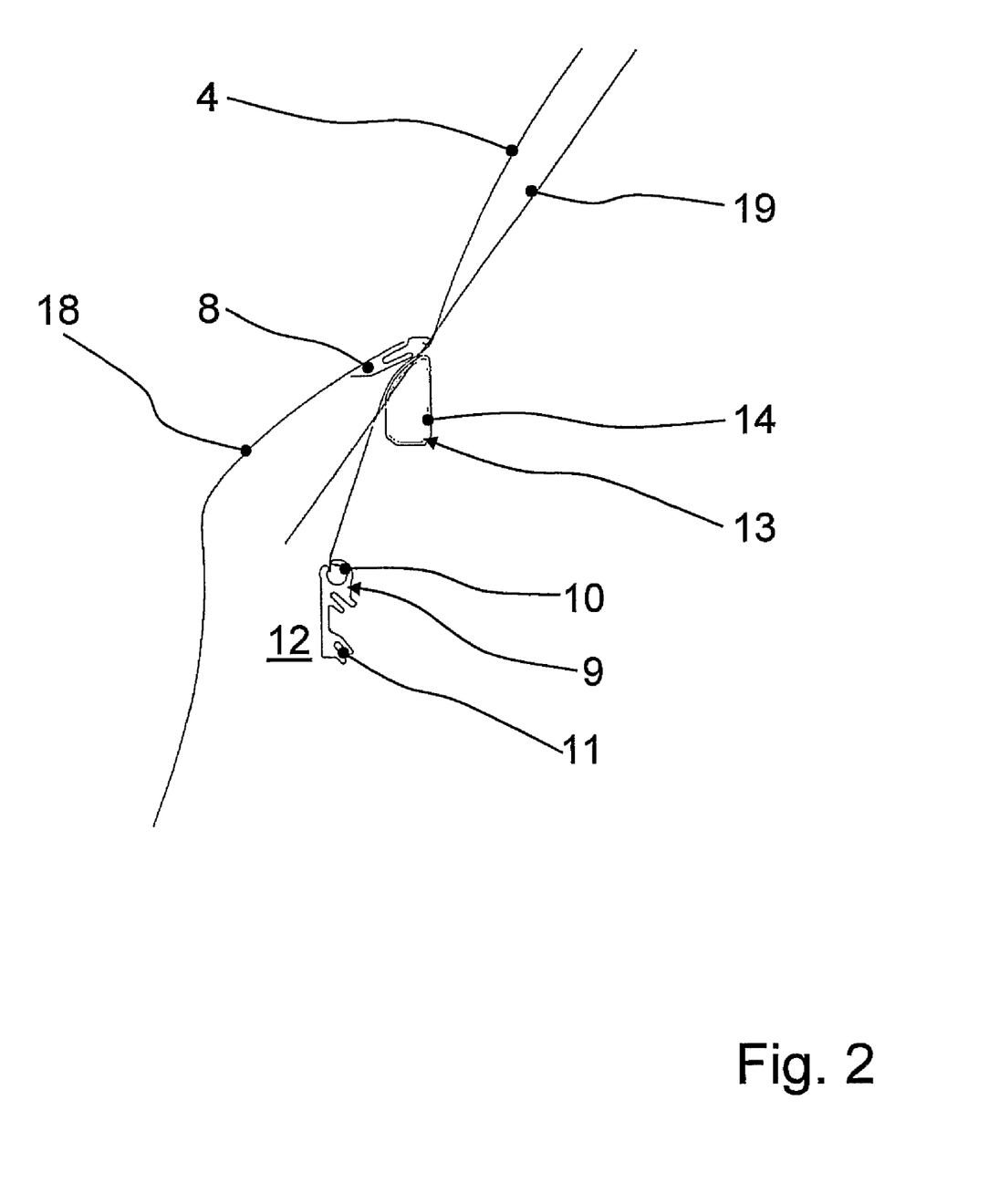
FIG. 2 shows a schematic, simplified cross-section through a clamping device of a convertible top according to the invention of FIG. 1, along line II-II in FIG. 1.
Figure 4:
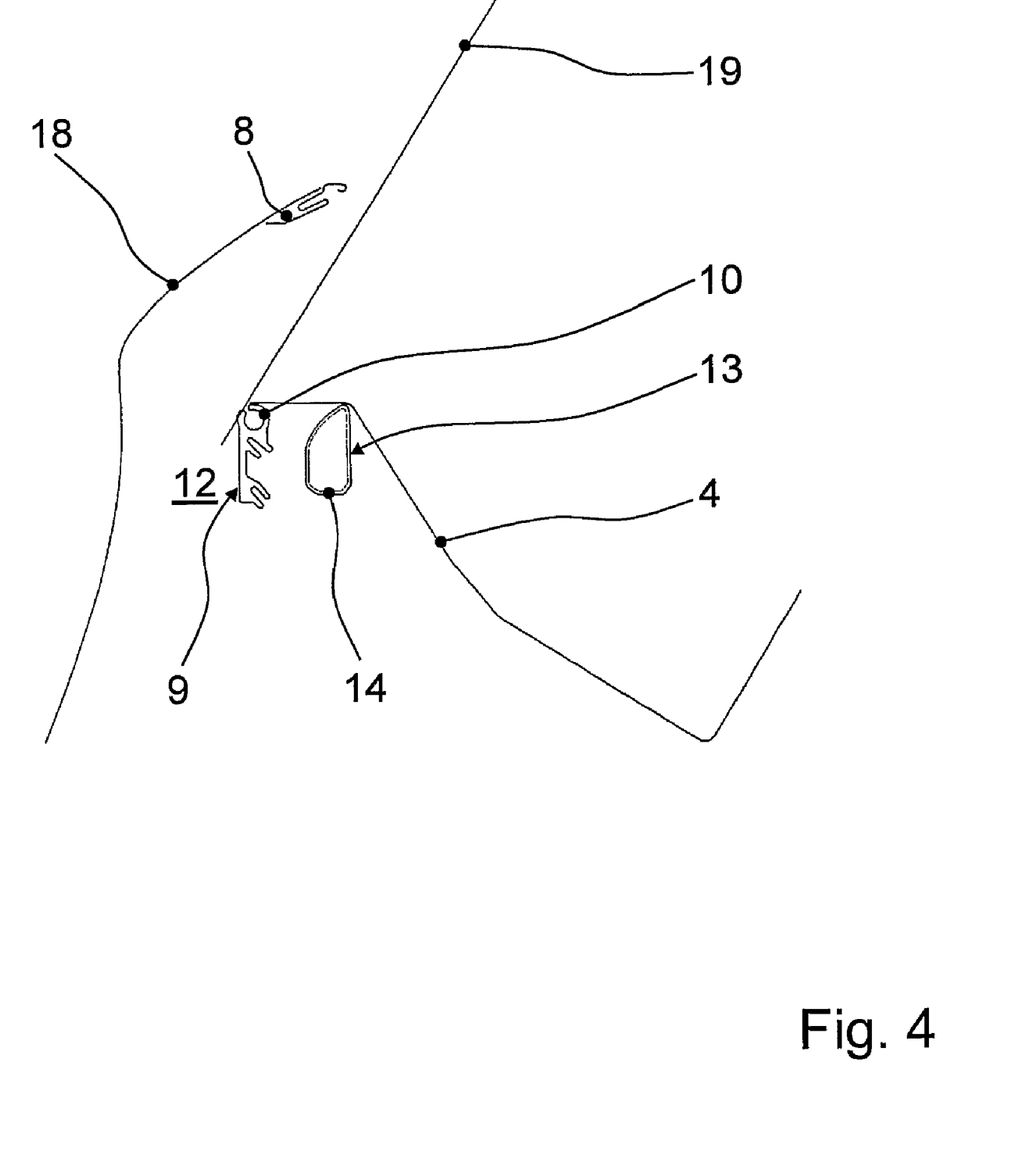
FIG. 4 shows a schematic cross-section corresponding to FIG. 2 through the clamping device according to the invention in the stored state of the convertible top.
Figure 5:
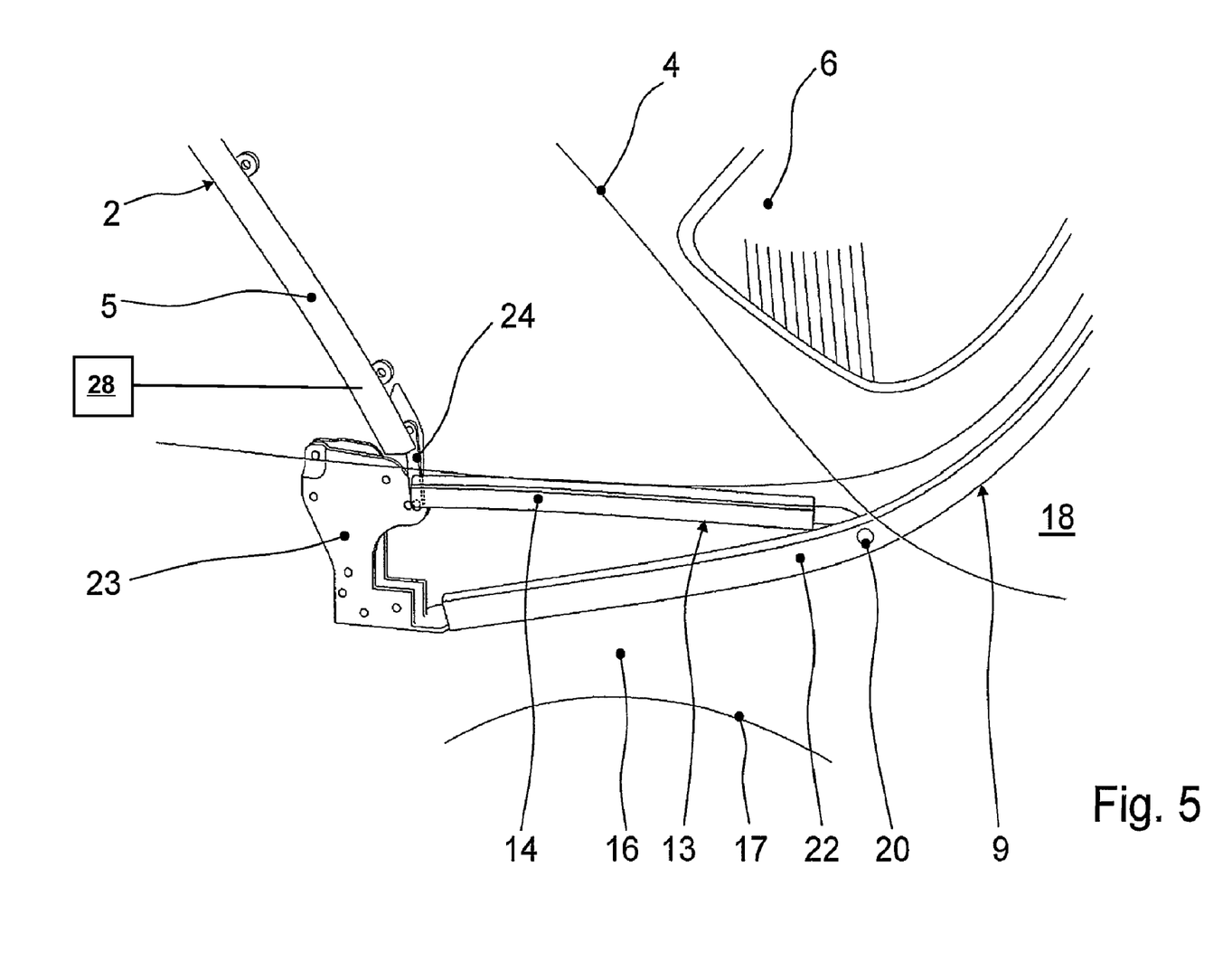
FIG. 5 shows a simplified perspective view of the clamping device according to the invention in the closed state of the convertible top according to FIGS. 1 through 3 and schematically represents the drive device engaging the convertible-top rod.
Figure 6:
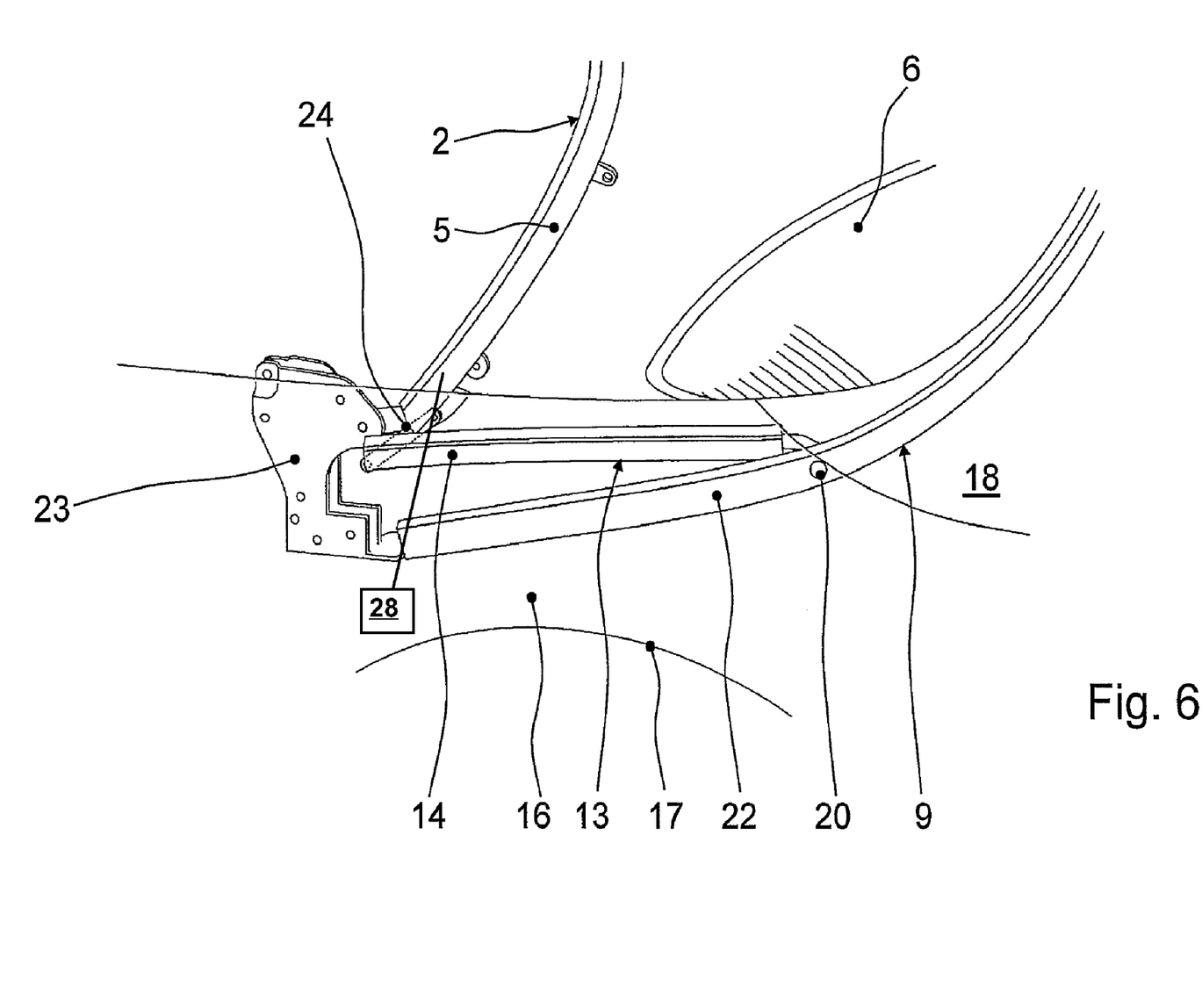
FIG. 6 shows a view of the clamping device according to FIG. 5 in a partially opened state of the convertible top and schematically represents the drive device engaging the convertible-top rod.
Figure 7:
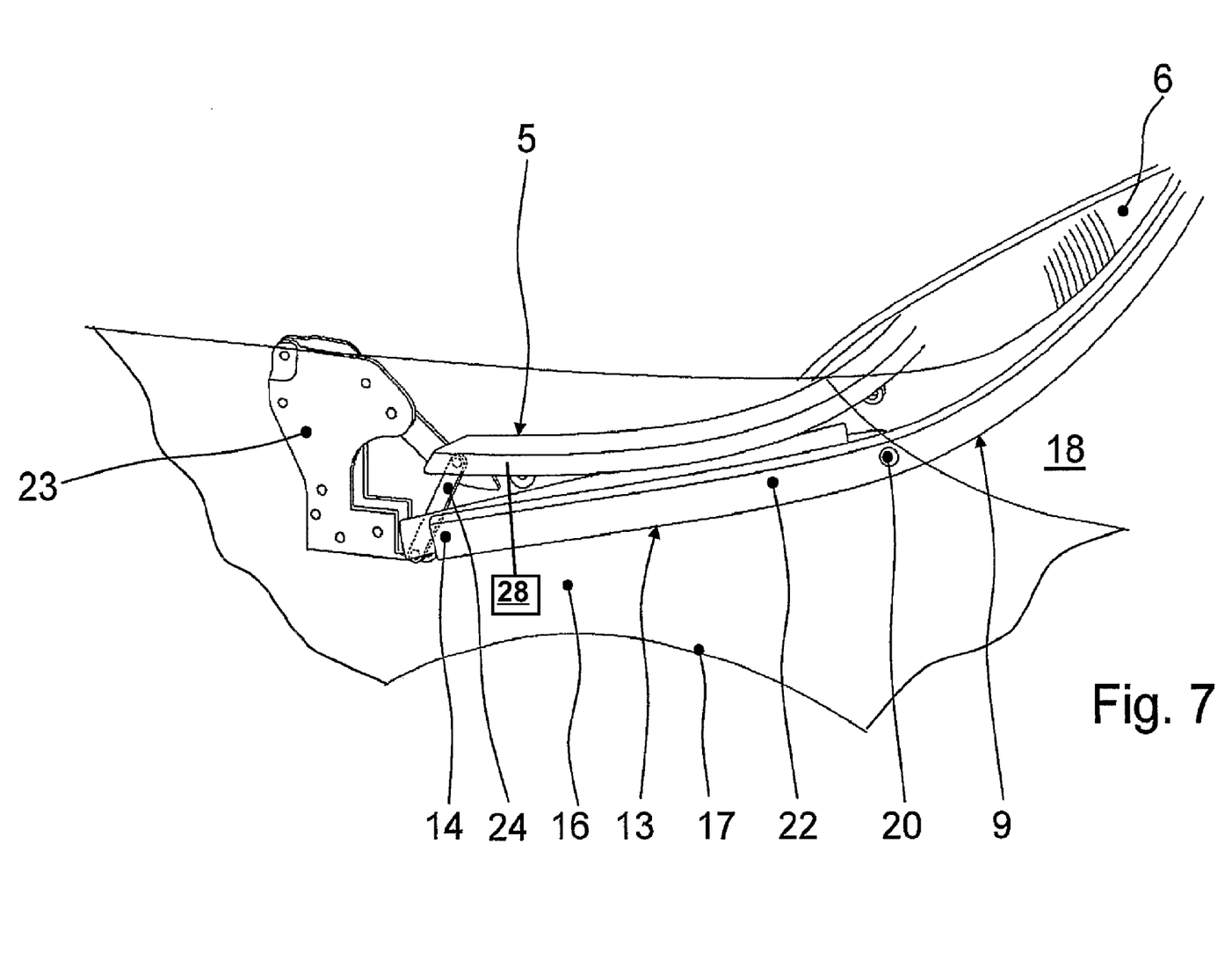
FIG. 7 shows a perspective view of the clamping device corresponding to FIG. 5 and FIG. 6 in the stored state of the convertible top and schematically represents the drive device engaging the convertible-top rod.

For this purpose, the vehicle body 7 has an attachment device 9 beneath a body opening line with an auto-body closure seal 8, further shown in FIG. 2 through FIG. 4. The attachment device 9 is designed in the depicted variant with a clamping strip 10 that holds the flexible roof panel 4, and connection contours 11 for joining to a clip 22 or to other body elements in the region of a body shaft 12, for example, a water-channel profile or a convertible top sheet.

For tightening of the flexible roof panel 4 in the closed state of convertible top 2, a clamping device 13 is provided, which, in the variant according to FIG. 1 through FIG. 7, is designed with two brackets 14, 15 assigned to each side of the vehicle. The side brackets 14, 15 each have a first end 29, i.e., a front end, in spaced relationship to a second end 30, i.e., a rearward end, as shown in FIGS. 1 and 5-7.

The side brackets 14, 15 can be moved between a first position, shown schematically in FIG. 4 through FIG. 7 with the convertible top 2 stored, and a second position shown in FIGS. 1, 2, 3, and 5 in the closed state of the convertible top 2, whereby the brackets 14, 15 in the closed state of convertible top 2 force the roof panel 4 against the auto-body closure seal 8 arranged in the region of the body-opening line.

The body-opening line in the variant shown is formed by an upper edge of the side outer surface 16 of the auto-body, above a wheel opening 17 and by an upper edge of a rear cover 18. Alternatively, it can also be provided that, for example, instead of the rear cover 18, a rear body element designed in several parts can form the body-opening line.

As can also be seen from the theoretical clamping direction 19 of the flexible roof panel 4 illustrated in FIG. 2 and FIG. 3, the clamping direction of the flexible roof panel 4 is changed by the clamping device 13, so that in the closed state of the convertible top 2, the flexible roof panel 4 lies sealed against the body closure seal 8.

In the advantageous embodiment shown according to FIG. 1 through FIG. 7, the side brackets 14, 15 can be pivoted on their second ends 30 about a pivot point 20 and 21, which is attached to the body and is arranged, in this case, on the attachment device 9 of the vehicle body 7 for the flexible roof panel 4.

The attachment device 9 in the depicted variants consists essentially of an at least roughly U-shaped clip 22 extending over the vehicle width, on which the clamping profile or strip 10 is mounted, at least in areas, to hold the flexible roof panel 4.

Depending on the application, an expert in the art will also be able to select an attachment of the flexible roof panel to clip 22 with a clamping profile deviating from the variant shown or another element attached to the auto body by means of screwing, riveting, etc., if this is more appropriate for the specific application.

In the variants shown, the clip 22 of the attachment device 9 is joined with its corresponding ends to a convertible-top main support 23 arranged in the side area of the vehicle, on which a drive device 28 engages and drives the convertible-top rod 5. With respect to its dimensioning, the clip 22, in the present case, is larger than brackets 14, 15 which are arranged more inside of the vehicle than the clip 22.

The side brackets 14, 15 are articulated at their first ends 29 on the vehicle front by means of a toggle lever 24 and the convertible-top rod 5 to the main convertible-top support 23. The articulation of the side brackets 14, 15 is arranged at a higher point, with respect to the vehicle height, than the articulation of clip 22 of the attachment device 9.

The clamping device 13 connected to the convertible-top rod 5 and thereby to the main convertible-top support 23, in the variant according to FIG. 1 through FIG. 7. The clamping device 13 is movable by means of the drive device 28 that drives the convertible-top rods 5, which, is, for example, a hydraulic cylinder, and can therefore be moved with the motion of the convertible-top rods 5.

Figure 8:
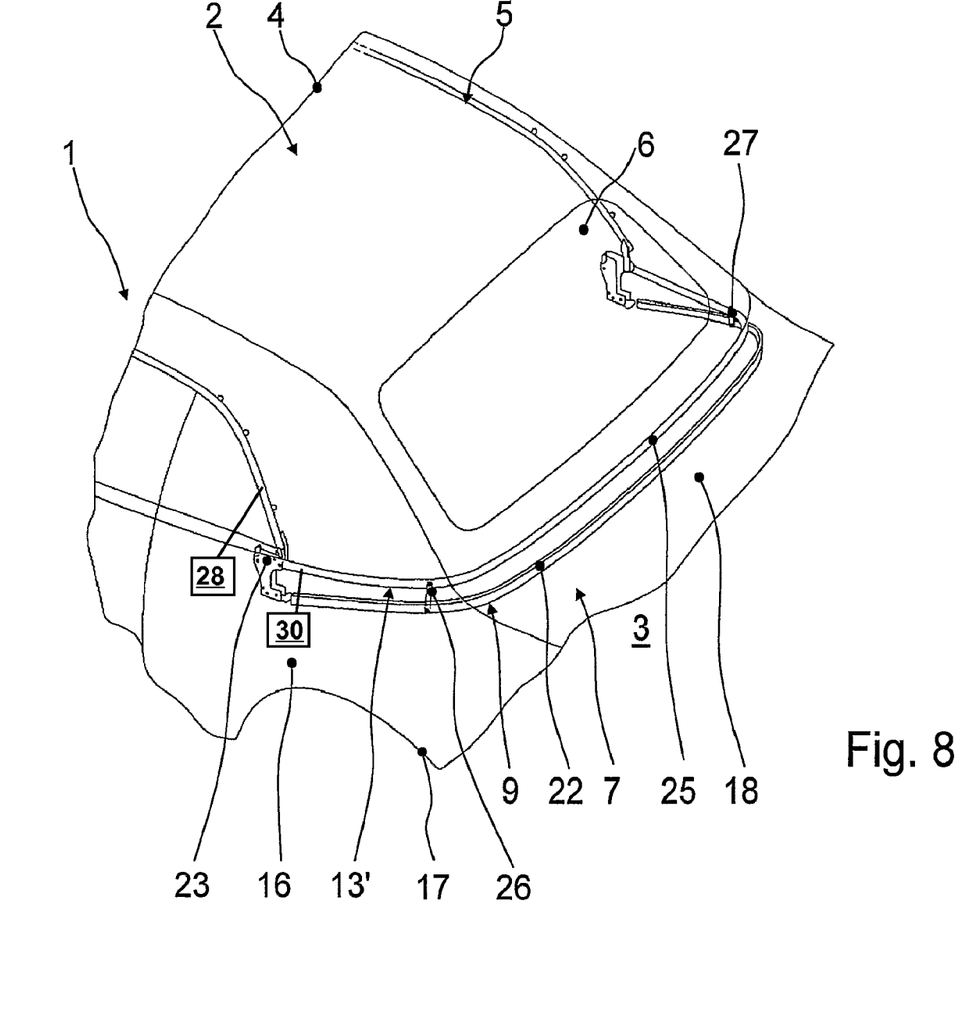
FIG. 8 shows a partial perspective view of the top of the convertible vehicle of FIG. 1 with an alternative embodiment of the clamping device and schematically represents the drive device engaging the convertible-top rod and a separate drive device engaging a bracket.

An alternative variant of a clamping device 13' for the flexible roof panel 4 of the convertible top 2, corresponding in design to the depiction of FIG. 1 to FIG. 7, is shown in FIG. 8.

In contrast to the variant according to FIG. 1 through FIG. 7, with two side brackets 14, 15, the clamping device 13' depicted in FIG. 8 is designed with a single bracket 25, which is designed essentially U-shaped, like the clip 22 of the attachment device 9, and is joined with its ends to the corresponding side main convertible-top support 23.

In its rear area, in the region of the transition between the side arms to the cross-arm of the U-shaped bracket 25, the bracket 25 is connected on both sides by means of a toggle lever 26 and 27 to the clip 22 of the attachment device 9 and is thereby attached to the body.

Further, similar to the side brackets 14, 15 provided in the variant according to FIG. 1 through FIG. 7, the bracket 25 can be moved from a position with the stored convertible top 2, in which the bracket 25 is essentially situated at the vehicle height of clip 22 of the attachment device 9, into a position that forces the flexible roof panel 4 against the auto-body closure seal 8. In contrast to the variant according to FIG. 1 through FIG. 7, a separate drive 30 for bracket 25 is provided here, which can be controlled as a function of the motion of the convertible-top rod 5.

In other variants, it can naturally be provided that a clamping device, which corresponds essentially to the clamping device 13 depicted in FIG. 1 through FIG. 7, be equipped with a separate drive 30, or that a single clip be connected as in FIG. 8 to the convertible-top rod 5 without its own drive device 28.

LIST OF REFERENCE NUMBERS

1 Convertible vehicle
2 Convertible top
3 Storage space
4 Flexible roof panel
5 Convertible-top rod
6 Rear window
7 Vehicle body
8 Auto-body closure seal
9 Attachment device
10 Clamping profile
11 Connection contours
12 Body shaft
13 Clamping device
13' Clamping device
14 Side bracket
15 Side bracket
16 Outer surface
17 Wheel opening
18 Rear cover
19 Theoretical clamping direction
20 Pivot point
21 Pivot point
22 Clip of the attachment device
23 Main convertible-top support
24 Toggle lever
25 Bracket
26 Toggle lever
27 Toggle lever

The invention claimed is:

1. A top for a convertible vehicle with a flexible roof panel, which is attached to an arrangement of convertible-top rods and, in its rear area, to an attachment device of the vehicle body, in which a clamping device, acting on the flexible roof panel in the region of its attachment to the vehicle body in the closed state of the convertible top, is provided, said clamping device comprising:
   said clamping device including a side bracket assigned to each side of the vehicle;
   wherein each side bracket includes a first end in spaced relationship to a second end;
   wherein the side bracket forces the flexible roof panel in the closed state of the convertible top against an auto-body closure seal,
   wherein the side bracket is pivotable at the second end around a pivot point that is attached to the vehicle body at the second end of the side bracket such that the second end of the side bracket and the pivot point are at the same height in the open state as in the closed state.

2. A top for a convertible vehicle with a flexible roof panel, which is attached to an arrangement of convertible-top rods and, in its rear area, to an attachment device of the vehicle body, in which a clamping device, acting on the flexible roof panel in the region of its attachment to the vehicle body in the closed state of the convertible top, is provided, said clamping device comprising:
   said clamping device including a side bracket assigned to each side of the vehicle;
   wherein each side bracket includes a first end in spaced relationship to a second end;
   wherein the side bracket forces the flexible roof panel in the closed state of the convertible top against an auto-body closure seal,
   wherein the side bracket is pivotable at the second end around a pivot point that is attached to the vehicle body at the second end of the side bracket such that the second end of the side bracket and the pivot point are at the same height in the open state as in the closed state;
   wherein each side bracket is movable between a first position in the stored state of the convertible top and a second position that tightens the flexible roof panel in the closed state of the convertible top, such that each side bracket is pivoted upward with the first end against the auto-body closure seal.

3. A convertible top according to claim 1, wherein the side bracket is arranged essentially in the longitudinal direction of the vehicle.

4. A convertible top according to claim 1, wherein each side bracket in the opened state of convertible top, is arranged essentially at the height of the attachment device of the flexible roof panel and at a spacing from the attachment device.

5. A convertible top according to claim 1, wherein the side bracket is attached to the arrangement of convertible-top rods and can be moved by means of a drive device that drives the convertible top rods with the motion of the convertible-top rods.

6. A convertible top according to claim 1, wherein the side bracket is attached to a main convertible-top support.

7. A convertible top according to claim 1, wherein the attachment device of the vehicle body has a clamping profile for holding the flexible roof panel.

8. A convertible top according to claim 1, wherein the attachment device of the vehicle body has an at least roughly U-shaped clip essentially spanning the width of the vehicle, to which the flexible roof panel is firmly connected.

9. A convertible top according to claim 2, wherein the side bracket is arranged essentially in the longitudinal direction of the vehicle.

10. A convertible top according to claim 2, wherein each side bracket in the opened state of convertible top, is arranged essentially at the height of the attachment device of the flexible roof panel and at a spacing from the attachment device.

11. A convertible top according to claim 2, wherein the side bracket is attached to the arrangement of convertible-top rods and can be moved by means of a drive device that drives the convertible top rods with the motion of the convertible-top rods.

12. A convertible top according to claim 2, wherein the side bracket is attached to a main convertible-top support.

13. A convertible top according to claim 2, wherein the attachment device of the vehicle body has a clamping profile for holding the flexible roof panel.

14. A convertible top according to claim 2, wherein the attachment device of the vehicle body has an at least roughly U-shaped clip essentially spanning the width of the vehicle, to which the flexible roof panel is firmly connected.

\* \* \* \* \*